(12) United States Patent
Gildner et al.

(10) Patent No.: US 10,888,994 B2
(45) Date of Patent: Jan. 12, 2021

(54) ACTUATOR FOR SUBSEA AND WET ENVIRONMENTS

(71) Applicant: CALIFORNIA INSTITUTE OF TECHNOLOGY, Pasadena, CA (US)

(72) Inventors: Matthew Gildner, Pasadena, CA (US); Justin R Koch, Pasadena, CA (US); Torkom A Pailevanian, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 63 days.

(21) Appl. No.: 16/401,727

(22) Filed: May 2, 2019

(65) Prior Publication Data
US 2019/0341825 A1     Nov. 7, 2019

Related U.S. Application Data

(60) Provisional application No. 62/665,736, filed on May 2, 2018.

(51) Int. Cl.
| | |
|---|---|
| *H02K 5/132* | (2006.01) |
| *H02K 5/173* | (2006.01) |
| *H02K 5/22* | (2006.01) |
| *H02K 7/08* | (2006.01) |
| *H02K 7/102* | (2006.01) |
| *H02K 7/116* | (2006.01) |
| *H02K 11/22* | (2016.01) |
| *H02K 11/215* | (2016.01) |
| *F16H 49/00* | (2006.01) |

(Continued)

(52) U.S. Cl.
CPC ............ *B25J 9/126* (2013.01); *F16H 49/001* (2013.01); *H02K 5/132* (2013.01); *H02K 5/1735* (2013.01); *H02K 5/225* (2013.01); *H02K 7/085* (2013.01); *H02K 7/1023* (2013.01); *H02K 7/116* (2013.01); *H02K 11/0141* (2020.08); *H02K 11/022* (2013.01); *H02K 11/215* (2016.01); *H02K 2213/12* (2013.01)

(58) Field of Classification Search
CPC ...... B25J 9/126; F16H 49/001; H02K 11/022; H02K 11/215; H02K 2213/12; H02K 5/132; H02K 5/1735; H02K 5/225; H02K 7/085; H02K 7/1023; H02K 7/116; H02K 7/003
USPC .......................................................... 310/71
See application file for complete search history.

(56) References Cited

U.S. PATENT DOCUMENTS

| | | | | |
|---|---|---|---|---|
| 4,506,590 A | * | 3/1985 | Miki ................... | B25J 17/0241 192/30 W |
| 5,327,790 A | * | 7/1994 | Levin ..................... | B25J 9/12 73/862.321 |

(Continued)

OTHER PUBLICATIONS

3500 Series Rotary Actuator with Brake Datasheet. 2G Engineering, 2016. 1 Page.

(Continued)

*Primary Examiner* — Alex W Mok
(74) *Attorney, Agent, or Firm* — Steinfl + Bruno, LLP

(57) ABSTRACT

A compact, high torque actuator includes a brushless motor, motor control electronics, an inner hollow tube to transmit rotation of an output plate to the input end of the actuator, thus allowing two absolute magnetic encoders to read an absolute position of the input and output of the actuator. The actuator is sealed to operate in fluid environment at high pressures.

8 Claims, 20 Drawing Sheets

(51) Int. Cl.
B25J 9/12 (2006.01)
H02K 11/01 (2016.01)

(56) References Cited

U.S. PATENT DOCUMENTS

| | | | | |
|---|---|---|---|---|
| 5,634,373 | A * | 6/1997 | Cuffe | F16H 25/20 |
| | | | | 74/640 |
| 5,720,375 | A * | 2/1998 | Maeda | F16D 13/04 |
| | | | | 192/35 |
| 6,255,751 | B1 * | 7/2001 | Hoffmann | H02K 7/083 |
| | | | | 310/40 MM |
| 2004/0163919 | A1 * | 8/2004 | Kirkwood | B60K 17/344 |
| | | | | 192/84.6 |
| 2006/0011441 | A1 * | 1/2006 | Showalter | B60K 17/35 |
| | | | | 192/84.6 |
| 2006/0266146 | A1 * | 11/2006 | Waide | H02K 7/06 |
| | | | | 74/424.92 |
| 2010/0319478 | A1 * | 12/2010 | Tominaga | H02K 7/1025 |
| | | | | 74/490.07 |
| 2010/0329867 | A1 * | 12/2010 | Patel | H02K 7/1838 |
| | | | | 416/169 R |
| 2012/0215358 | A1 * | 8/2012 | Gettings | B25J 9/046 |
| | | | | 700/259 |

OTHER PUBLICATIONS

HDT Global: Adroit Rotary Actuators Brochure: Compact, High-Torque, Lightweight, 2015. 2 Pages.
Koch, J., et al., "Development of a Robotic Limb for Underwater Mobile Manipulation," OCEANS—MTS/IEEE Kobe Techno-Oceans Conference (OTO) paper presented May 31, 2018 and published Dec. 6, 2018. 5 Pages.
Remote Ocean Systems (ROS) Heavy Duty Rotator: R 100. Brochure—updated Nov. 21, 2014 Rev A. 1 Page.
Subsea 3D Scene Reconstruction Suite Flyer. 2018. 2 Pages.
Tecnadyne Model 400 DC Brushless Rotary Actuator Brochure. Mar. 25, 2014. 7 Pages.

* cited by examiner

ACTUATOR FOR SUBSEA AND WET ENVIRONMENTS

CROSS REFERENCE TO RELATED APPLICATIONS

The present application claims priority to U.S. Provisional Patent Application No. 62/665,736, filed on May 2, 2018, the disclosure of which is incorporated herein by reference in its entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to actuators. More particularly, it relates to an actuator for subsea and wet environments.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
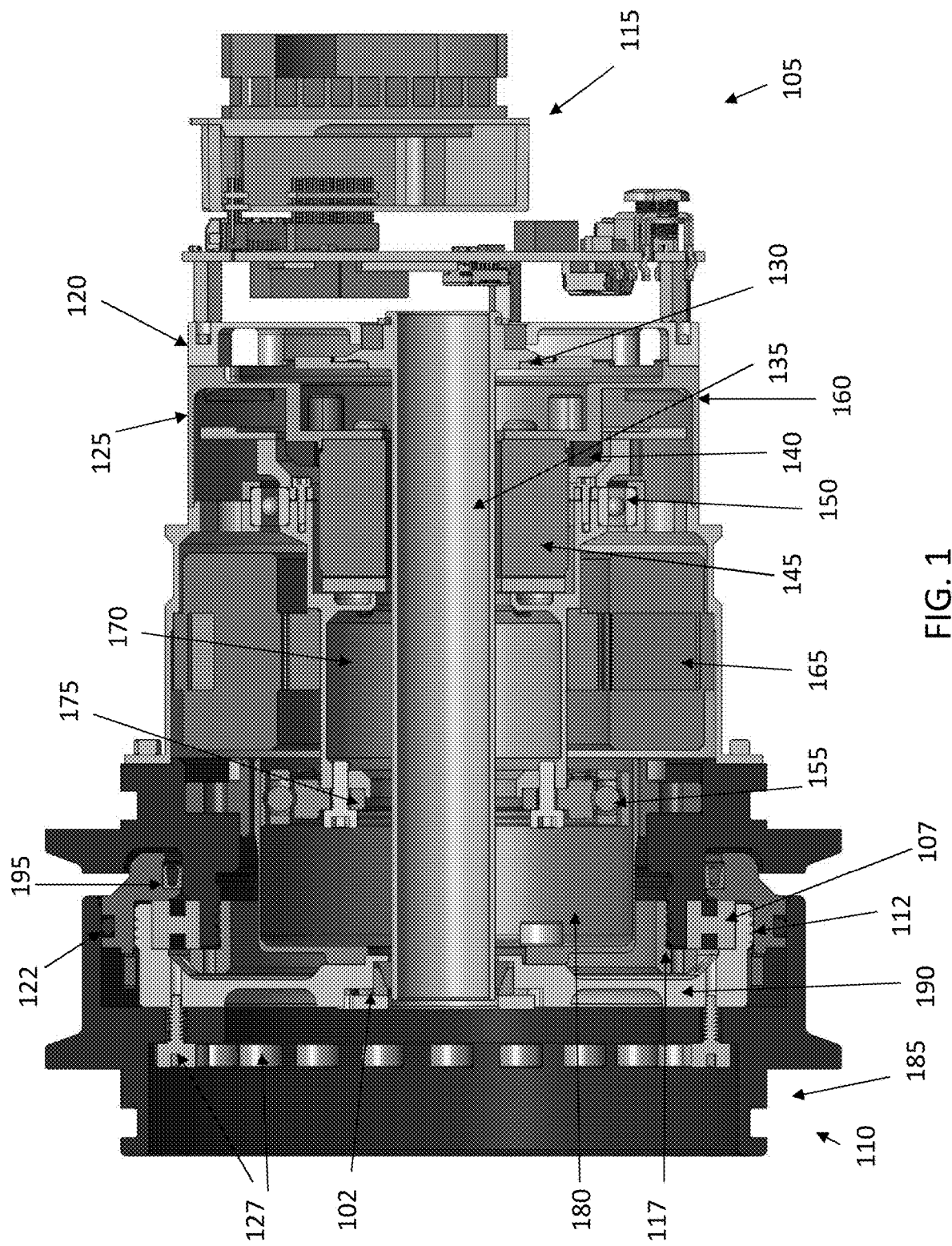
FIGS. 1-3 illustrate exemplary cross sections of an actuator according to the present disclosure.

In a first aspect of the disclosure, an actuator is described, the actuator comprising: an input end and an output end; an output plate at the output end; a brushless motor configured to generate a torque at the output plate; a harmonic gearset connected to the brushless motor; a hollow tube attached to the output plate and configured to rotate with the output plate, the hollow tube having an output encoder disk at the input end, the output encoder disk configured to rotate with the hollow tube; power and data cabling within the hollow tube; an absolute magnetic output encoder at the input end, configured to read a position of the output encoder disk, thereby obtaining a position of the output plate; an input encoder disk at the input end and attached to a rotor of the brushless motor; an absolute magnetic input encoder at the input end, configured to read a position of the input encoder disk; a magnetic brake configured to break the brushless motor; a circular magnetic shield between the magnetic brake and the absolute magnetic output encoder, configured to shield the absolute magnetic output encoder from magnetic interference by the magnetic brake; a plurality of ball bearings configured to allow the brushless motor to rotate relative to the actuator; a plurality of circular seals configured to seal an inside of the actuator from a liquid environment outside the actuator; and a plurality of clamps configured to compress the plurality of circular seals.

DETAILED DESCRIPTION

The present disclosure describes an actuator comprising a brushless motor, a drivetrain, encoders to provide feedback about the current position of the motor, a mechanical assembly comprising seals to operate in a liquid environment, and electronic modules to control the operation of the actuator. Several actuators can be linked together to obtain, for example, a robotic arm manipulator where each actuator joint can rotate independently from the others, terminating in a manipulator module capable of manipulating external objects in a liquid environment.

Modular brushless DC (BLDC) rotary servo actuators are widely used for terrestrial robotics due to their small size, large power density, and ability to provide the precision positioning needed by many robotic applications including manipulation systems and sensor positioning. In addition to these features, robotic applications often require servoing components to be able to react to large cross-moment loads, orthogonal to the actuation axis, that are similar in magnitude to the motor's nominal torque capacity. Servo actuators with this feature set are not readily available for the environment requiring sealed designs such as underwater environments. Commercially available underwater BLDC servo actuators have low power density compared to terrestrial options and cannot react to relatively high cross-moment loads. Alternatives, such as rotary hydraulic actuators, require large pumps, accumulators and valve manifolds to drive multi axis systems. The size, weight and power footprint of these support components limits the modularity of rotary hydraulic actuators and the types of systems they can be integrated into.

The present disclosure describes an underwater, modular, BLDC rotary servo actuator that has been integrated into underwater dexterous robotic limb. The actuator's design incorporates many features found in terrestrial offerings while addressing the constraints and challenges of a subsea and wet environments. The actuator described in the present disclosure can be referred to as the S-PRIME actuator. The S-PRIME actuator is a harmonic geared, BLDC rotary servo actuator with integrated position sensing and drive electronics. With open fieldbus communication standards, it is possible to command and control many S-PRIME motors simultaneously with a single communication bus, making it suitable for networked robotics applications. In some embodiments, the S-PRIME actuator has the following specifications: Size: 225 mm (L)×120 mm (Dia); Weight (air): 4.2 kg; Weight (water): 1.6 kg; Max Torque: 285 Nm; Max Speed: 135 deg/s; Braking: 220 Nm, Powered disengaged; Power: 100 VDC, 0-14 A; Communication: Ethercat, RS-485. The S-PRIME actuator can comprise, in some embodiments, three subassemblies: structural, drivetrain, and sensing and control. The structural parts comprise the frame and connector that provide mechanical support; the drivetrain comprises the brushless motor and harmonic gear; the sensing and control parts comprise the input and output encoders that detect the rotation of the drivetrain, as well as the electronics to process and control data and command the drivetrain.

The S-PRIME structural subassembly comprises the actuator's waterproof housing, endcap and various elements used to secure and seal the actuator into the housing. Radial O-ring seals are used as static sealing elements. In some embodiments, the top of the subassembly contains a light lid with an LED illuminated ring. The light lid provides information about the actuator's state and indication of any leaks inside the housing. This indication feature was incorporated to aid in diagnostics and troubleshooting in field environments.

Marman clamps can be used to secure the actuator in its housing and connect any payloads or other structural elements to the actuators output. The Marman clamps attach around machined flanges found on the actuator and housing. These features are incorporated into the S-PRIME actuator's design to simplify mechanical integration of the unit and improve serviceability. Whereas alternative securing designs such as bolted on flanges or radial fasteners require many assembly and disassembly steps, the Marman clamp design allows for actuator removal from its housing through a two-bolt connection. Due to this design, payloads or output structural elements can be designed to attach to the actuator's output by incorporating a simple flange profile. Keyway features are found in the flange to provide clocking of the actuator or output payload and improve torque transmission across the interface.

The S-PRIME actuator drivetrain subassembly comprises a brushless DC motor, harmonic gearset, input and output bearings, radial dynamic deal and structural features. A harmonic gearset is used to provide high torque gear reduction with zero-backlash and few moving elements. Backlash greatly reduces the operational accuracy because the gear has some 'play' in its movement that cannot be accounted for during control. A large diameter cross-roller bearing is used at the motor's output to provide high cross-moment load reaction comparable in magnitude to the actuator torque rating. The cross-moment load consists in loads applied orthogonally to the torque of the actuator, which points along the longitudinal axis of the actuator. Cross-moment loads can damage an actuator if the actuator is not built to resist them. The bearing is secured in place using a low-footprint, threaded clamp design. Footprint and part count are significantly reduced by incorporating dynamic and static sealing elements, gearset mounting features and the housing interface into the output bearing clamping elements.

The S-PRIME actuator electric and sensing subassembly comprises input and output position encoders, a magnetic brake, control electronics, cable tube, and structural elements. Absolute position magnetic encoders provide the controller with position feedback on motor's position. The input encoder can be used to commutate the motor and input position feedback. The output encoder can provide output position feedback which is needed to servo the actuator. By incorporating absolute encoders, the actuator does not need position calibration between power cycles. In fact, magnetic encoders are the only type of absolute encoder that is compact and not affected by common environmental interference. Relative encoders only detect relative motion of the motor. There, relative encoders require calibration at different times, such as when recovering from a power loss. Absolute encoders detect the position of the drive and are therefore accurate even after power loss events. The absolute input and output encoders are placed away from the brushless motor, to negate its magnetic interference. Both encoders are placed close to the motherboard controlling them.

A magnetic brake is incorporated into the design to hold the actuator's position in powered off states. It is mounted onto the BLDC motor's rotor. A ferrous shield is mounted around the brake to limit electromagnetic interference between the brake's magnets and the magnetic encoders.

The S-PRIME actuator control electronics comprises a distributed BLDC motor controller mounted to a PCB. The PCB interfaces with the motor controller and contains a microprocessor, circuits and components to drive the encoders, brake and leak sensors. Leak sensors on the PCB monitor the actuator's internal pressure and humidity. If pressure or humidity fall below preset thresholds, the PCB will signal a fault on a dedicated leak detection line. The leak detection line can then be monitored by external command and control infrastructure to initiate any safety measures, such as power shutdown. A cable tube mounted to the actuator's output transmits the actuator's output position to the output encoder. The cable tube also provides a path for routing cable harnesses in the cases of multi-axis applications such as robotic limbs.

The S-PRIME actuator control electronics can support two means of controlling the actuator over fieldbus topologies. The distributed BLDC motor controller supports the EtherCAT™ standard, enabling high rate command and control for multi-axis applications. The microcontroller located on the PCB supports a low rate RS-485 serial communications link that also can be used to command and control multiple actuators on a single field bus. The RS-485 link provides direct access to sensors located on the PCB, such as the leak sensors. In other embodiments, different communication protocols may be used.

Commercially available underwater BLDC servo actuators have low power density compared to terrestrial options and cannot react to relatively high cross-moment loads. Comparable offerings offer 35% of the power density of the S-PRIME while lacking features for robotic applications like cross-moment capacity and zero-backlash. The S-PRIME actuator's compact, modular design allows it to outperform all commercial actuators, thanks to the careful assembly of all components in a compact arrangement.

In some embodiments, a brushless frameless motor is used, having a rotor and stator both bonded into custom aluminum housings, to mount the motor into the actuator body. The center of the motor is hollow allowing a cable tube to pass through the center. The output of the rotor is connected to the harmonic drive wave generator. The rotor is also connected to the input encoder and the electromagnetic break. The actuator of the present disclosure has an inner, centrally located tube, which allows cabling to pass and connect different components. Additionally, the inner tube rotates, allowing transmission of the rotational motion from the output end of the actuator to the input end of the actuator. Both the input and output encoders can then be placed at the input end, since the output encoder can read the rotation at the input end due to it being relayed by the inner, rotating tube.

A harmonic drive is used since this type of drive achieves high gear reduction for a low mass compared to other gearbox technologies. By rotating a wave generator across an elliptical flex spline coupled to an outer circular spline, a high gear reduction is achieved with zero backlash and excellent repeatability. The hollow nature of the flex spline allows the cable tube to pass through the center of the harmonic drive. The flex spline is attached to the output plate.

The inner, centrally located cable tube allows wires to run coaxial to the actuator to join subsequent actuators in a robotic arm. It is also advantageous when using single actuators. This feature eliminates the need for exterior underwater connectors, as all wiring is run interior to the actuator. The cable tube also allows an output encoder to be mounted adjacent to the motherboard as the cable tube rotates with the output of the actuator while the motherboard is fixed.

The output plate of the actuator comprises a cross roller bearing, which allows high cross-moment capability compared to other types of bearings. This design integrates the bearing within the sealed assembly which eliminates the need for a rugged design, and environmental sealing of the bearing. The cross-roller bearing allows rotation between the output plate and the circular spline mount.

A dynamic spring seal allows motion between the actuator mount and the output plate, while sealing the inside of the actuator housing from the outside environment (e.g. water). The actuator geometry and placement of the cross roller bearing enables high rigidity to ensure no gapping occurs across the seal even under high cross-moments to the actuator. In some embodiments, the actuator is filled with oil that is pressure balanced to the external pressure, in order to operate at high external pressure, e.g. at deep depths in seawater.

The actuator can use Marman clamp interfaces, comprising a flange on the output plate (rotating interface) and on the circular spline mount (fixed interface), which enable quick assembly or disassembly of the actuator. A mating geometry is found on the actuator housing which allows the two flanges to be rigidly coupled through the use of a Marman clamp. The Marman clamp used in the present disclosure is a custom design which secures with two fasteners. A titanium key and mating key groove allows transfer of larger torque than the friction alone of the Marman clamp. The titanium key and mating key groove can also be used to fix the rotational alignment of the actuator and housing during assembly.

An electromagnetic brake enables the actuator to lock the motion of the rotor, and thus of the actuator's output. A magnetic disk is mounted on the rotor while an electromagnet sits slightly above the disk to allow the motherboard to control engagement of the brake. The default state of the actuator is with the brake engaged, so that the actuator stops motion in the event of power-loss.

Two absolute magnetic encoders are placed near the motherboard—one to read the output (motion transferred through the cable tube) and one to read the input (on the rotor). These allow accurate position tracking both before and after the harmonic drive for high-performance commutation and accurate actuator output tracking. A one-time calibration routine removes the need for having to redo calibration even after power-down or removal of the actuator from a housing.

An integrated motherboard and motor controller enable control of the actuator via Ethercat™ for high bandwidth telemetry. The motherboard is a custom PCB with an integrated microcontroller, motor controller, environmental sensing, and communication bus. This significantly reduces the number of cables that need to be routed up a robotic arm as actuators can be daisy-chained together via a power-bus and Ethercat™ networking. The motherboard sits at the top of the actuator connected to the stator housing and brake cap. In some embodiments, the actuators of the present disclosure can deliver a max torque of 285 Nm or more, with a mass of 4.2 kg in air.

The present disclosure describes an extremely compact, modular design that allows for high torque (Nm) to volume (l) ratio of ~100 (Nm/l) while maintaining a low aspect ratio cylindrical footprint, the volume being the total volume of the actuator. The actuator can have a pressure rating of 10.9 atm or 100 m depth. These advantages can be achieved due to the mechanical housing and output interfaces, co-location of brake and rotor, encoders and motherboard on input subassembly attached to the stator of the brushless motor, compact design of the output subassembly with cross-roller bearing, and use of a harmonic geartrain.

A low-footprint, sealed output subassembly provides cross-moment support capacity with comparable magnitude to output torque. The high cross-moment support capacity of an actuator is highly desirable in robotic manipulator applications. The design of the present disclosure removes the need for adding a high capacity output bearing requiring additional environmental sealing when integrating an actuator into a mechanism.

The output sub-assembly comprised a high-performance cross-roller bearing that is mounted in between threaded clamps. One clamp serves as a bearing inner race clamp, provides a running surface for the output cap dynamic seal, a mount for a harmonic gear assembly's circular spline and provides radial o-ring groove for housing seal. Another clamp serves as a bearing outer race clamp, a seat for the output cap dynamic seal, mount for the output cap, and provides a radial O-ring groove for sealing output subassembly with an endcap. This is achieved through the multi-function design of the output plate which transfers motion from the output of the harmonic drive flex-spline, clamps the outer race of the output bearing, engages the threads of the bearing clamp, and connects to the cable tube to route co-axial cables and transfer motion to the output encoder located on the other side of the assembly (next to the motherboard). An internal through-bore harnessing design removes the need for external, waterproofed harnessing when integrating with other assemblies. Harnessing, as known to the person of ordinary skill in the art, comprises the connection of different components with cables carrying power and data.

The harnessing design incorporates a central cable tube that is fixed to the output cap and is allowed to rotate relative to the input sub-assembly. All actuator power and data harnessing runs through the cable tube. The cable tube mounts to the output plate and rotates with the actuator motion. The other side of the cable tube mounts near the motherboard with a bearing. The encoder ring mounted to the cable tube allows the motion of the actuator output to be connected directly to the motherboard.

The absolute input encoder allows high performance commutation of the brushless motor. The input encoder ring is mounted directly to the rotor with the read head attached to the stator housing and wired to the motherboard. The encoder data is used by the motherboard and motor controller for commutation and initial calibration of the brushless motor. The absolute, one-to-one output position sensing mechanism removes the need of mounting position sensors at the output of an actuator. The mechanism transmits the output position to the input sub-assembly by means of the central cable tube. The cable tube is directly attached to the output plate and rotates with the output. The cable tube incorporates a flange-mounted magnetic absolute encoder ring that rotates relative to the actuator's input sub-assembly containing an encoder ring read sensor. This allows the encoder read assembly to both be mounted on the same side as the motherboard and to remain static relative to the motherboard even as the actuator output rotates.

An input sub-assembly enables the co-location of magnetic rotary absolute position sensors (encoders) with a magnetic brake (rare earth magnets with a canceling electromagnetic coil). The input sub-assembly mounts a magnetic brake in the center of two encoder assemblies. Normally, this type of magnetic interference would lead to drop-out zones on the magnetic encoder impacting position sensing. A ferrous shield is mounted around the top of the brake to reduce the strength of the magnetic field generated by the brake away from encoder read sensors. The shield mounts directly to the stator cap.

Actuator environment sensing (humidity, temperature, pressure) is integrated into actuator motherboard. Sensors can be queried through the actuator data channels to detect sealing leaks during actuator assembly and during operation. The actuator motherboard acts as a carrier board for the actuator networked motor controller and incorporates a microcontroller and other circuits to support environmental sensing functions. These environmental sensors include temperature, pressure, and humidity.

The actuator's motherboard contains onboard firmware that can report on current state of environmental sensors or detect leaks through different leak-detection algorithms. Firmware environmental sensing outputs are in the form of data reported on the data channels or as a trigger for onboard visual or audio indicators such as an actuator housing LED light, board mounted buzzer, or board mounted LED. Marman clamps and flange key mechanical interfaces can be used for fast assembly and servicing with high reactive load capacity. A 2-bolt Marman clamp is used for both the housing interface and output interface. The actuator mounting flange and output flange incorporate a radial titanium key feature to provide rotary alignment/registration and slip-limiting feature for clamp overloading. The interface also incorporates radial O-ring seals for sealing to actuator housings or other assemblies at the actuator output. The Marman clamp can be removed by unscrewing 2 fasteners opposite each semi-circle of the 2-part Marman clamp.

Incorporation of an Ethercat™ capable networked motor controller that allows for the transmission of commands and actuator telemetry at 100 Mbps. This enables high bandwidth control of the actuator while maintaining a high rate of telemetry transmission. Motor control system is comprised of an Ethercat™-capable motor controller mounted on the actuator motherboard and Ethercat™-compatible harnessing running through the actuator's central harnessing system.

A zero-backlash design provides high position certainty under a wide range of actuator load magnitudes and independent of direction. This can be achieved through the use of a rotary harmonic gear between the brushless dc motor and output assembly with no additional gearing. The rigid, zero backlash design means that the rotating parts do not move unless actuated upon, and move only by the specified amount, ensuring accurate placement.

FIG. 1 illustrates a cross section of an exemplary actuator, whose longitudinal axis lies in the plane of the figure. The person of ordinary skill in the art will understand that several components discussed below have rotational symmetry around the longitudinal axis. The actuator has an input end (105), and an output end (110). The torque is applied at the output end. The output end can be linked to the next actuator to form a series of actuators. In FIG. 1, several actuator components can be identified, such as a motherboard (115) to control the actuator's operation, connected to the input (120) and output (125) magnetic absolute encoders. The encoders have a fixed head which magnetically reads the position of the rotating disk (130). The rotating disk is mechanically linked to the inner, hollow tube (135) through which the cabling is routed. Therefore, the hollow tube that runs along the central, longitudinal axis of the actuator is used both for harnessing (power and communication wiring) and for transmitting the rotational motion through the actuator. With this arrangement, the output encoder can be placed at the input end, isolating it from magnetic interference generated by the brushless motor. The absolute encoders provide an accurate determination of the position of the rotating disk, without the routine calibrations required by relative encoders. A circular magnetic shield (140) protects the encoders from magnetic interference generated by the magnetic brakes (145). The magnetic brakes allow braking of the actuator. The magnetic shield allows the use of absolute encoders.

Figure 18:
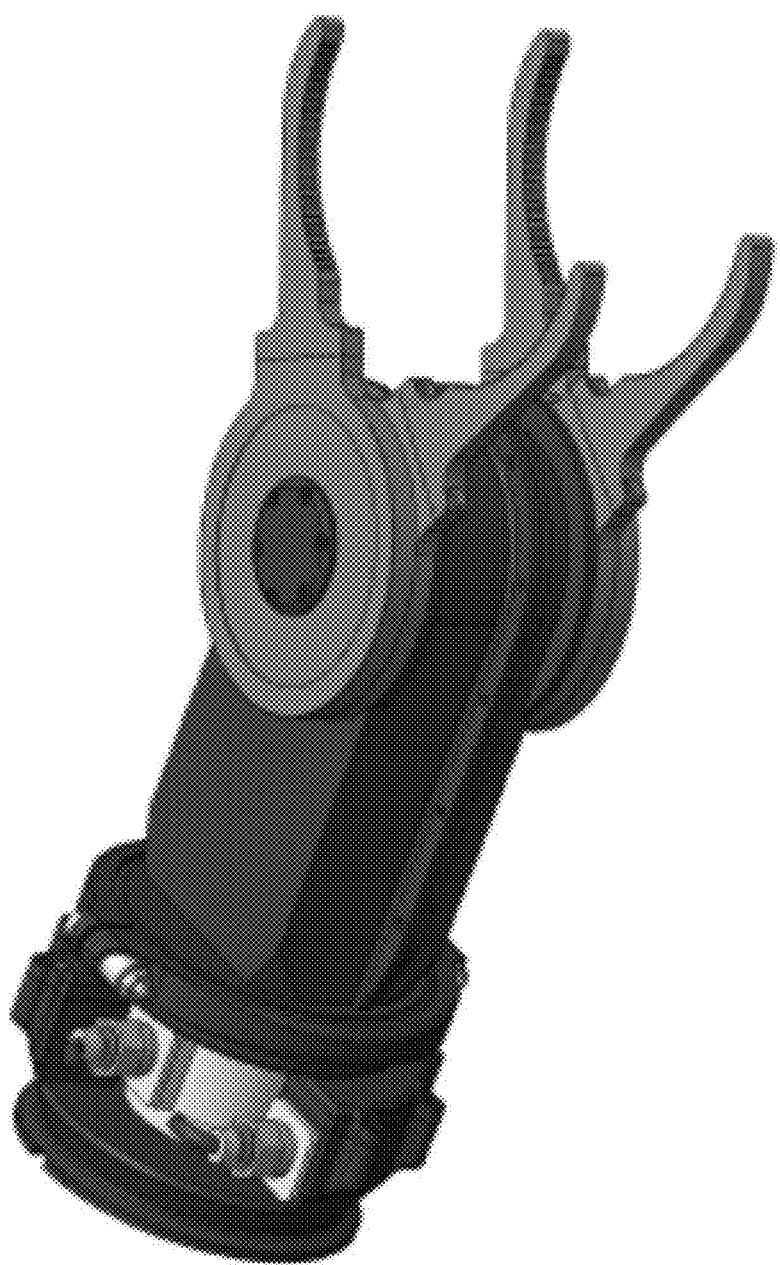
FIG. 18 illustrates an exemplary manipulator.

A first ball bearing (150) is illustrated, which let the motor rotate within the actuator. The stator cap of the motor (160) is towards the input end, while the motor (165) is around a mid-portion of the actuator, with the rotor (170) towards the center. FIG. 1 also illustrates an elliptical wave generator (175) and an output portion (180) of the harmonic gear contained in the actuator, which transmit motion within the actuator. As known to the person of ordinary skill in the art, a harmonic gear typically comprises an elliptical wave generator, a flex spline, and a circular spline. These are connected to the output plate (190). The actuator output end is attached to a sealing cap or structural element with a flange (185) and radial static O-ring seal. The output end can be connected to other actuators, to form a segmented robotic arm where each link can be independently controlled, or to a manipulator, such as for example that illustrated in FIG. 18.

A radial seal (195) is illustrated in FIG. 1. The radial seal (195) comprises a groove that allows an increased seal when the pressure external to the actuator increases. Two plastic wedges (102) act as a clamp to mechanically connect the inner tube (135) to the output plate (190). The inner tube transmits the rotation to the output encoder (125) through disk (130). An output cross-roller bearing is illustrated (107), having a cross section resembling an H shape, where each slot on both sides contains balls to form ball bearings. Threaded clamps (112,117) are illustrated, and allow the different parts of the actuator to be attached during assembly. The threaded clamps secure the output bearing and provide sealing surface and grooves. For example, an O-ring (122) is illustrated, forming a seal when the actuator parts are secured together. Several fasteners are used in the actuator. For example, fasteners are shown at the output plate (127).

Figure 2:
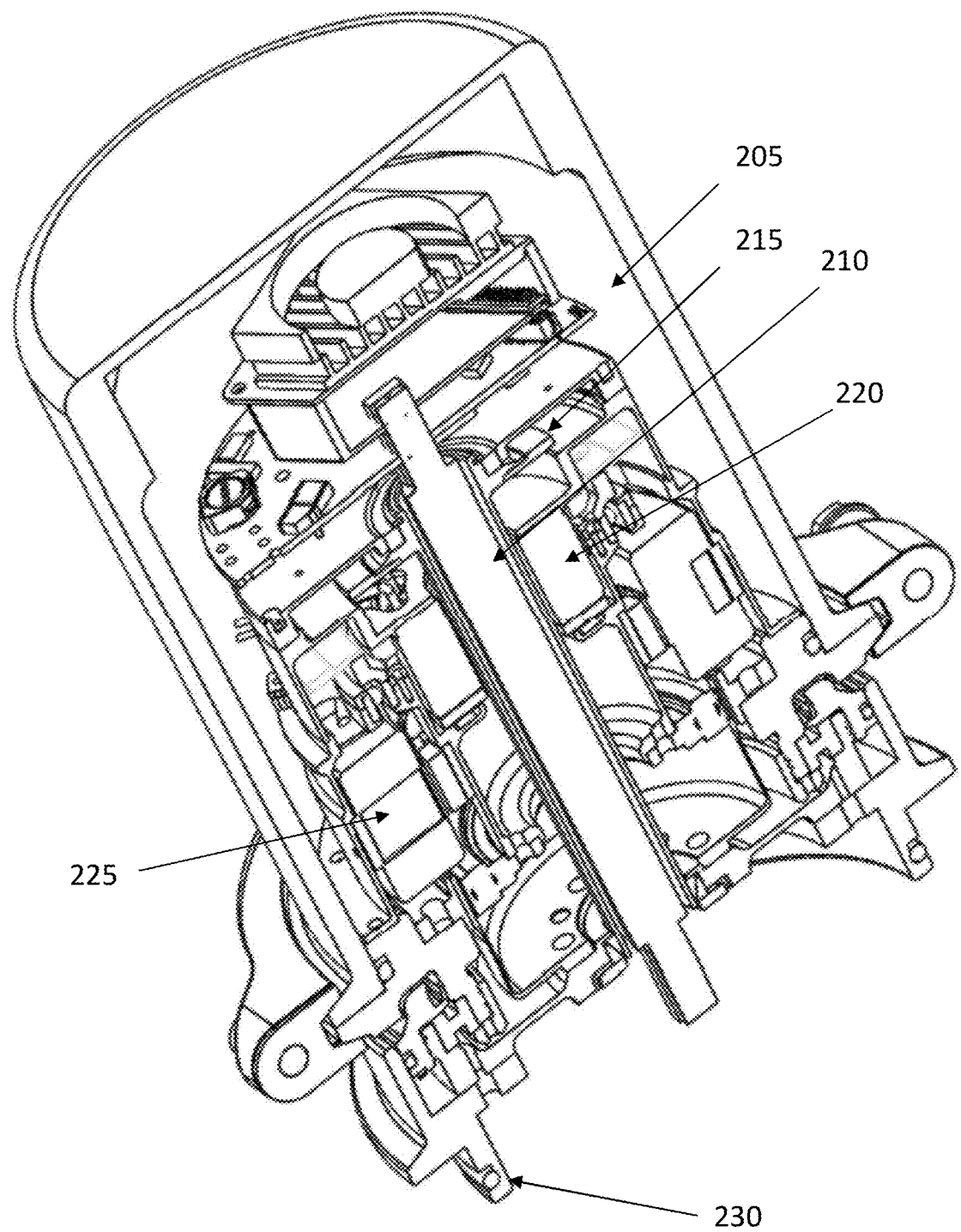
Figure 3:
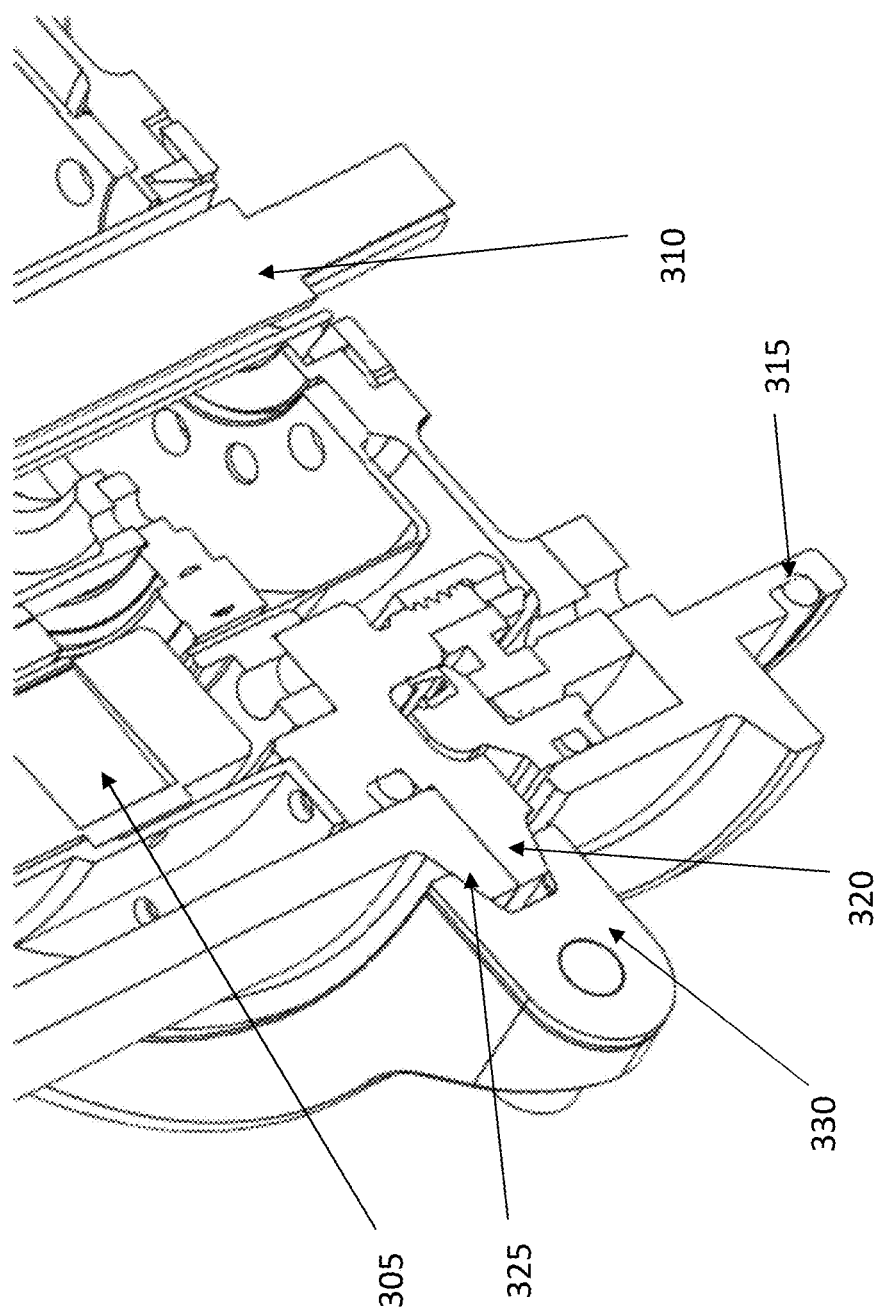

FIG. 2 illustrates a cross section of the actuator in a perspective view. Several elements shown in FIG. 1 are visible in FIG. 2: the encoders (205); the inner tube (210) attached to the disk (215) that allows the encoder to read the rotation of the tube; magnetic brake (220); motor (225); and O-ring (230). FIG. 3 illustrates a zoomed-in view of FIG. 2, illustrating elements visible in FIG. 1: motor (305); inner tube (310); and O-ring (315). FIG. 3 illustrates how parts of the mechanical frame of the actuator can have outward protrusions or flanges (320,325) configured for accepting a Marman clamp (330). The two opposite flanges allow application of the Marman clamp, which applies a force to the seals present in the actuator.

Figure 4:
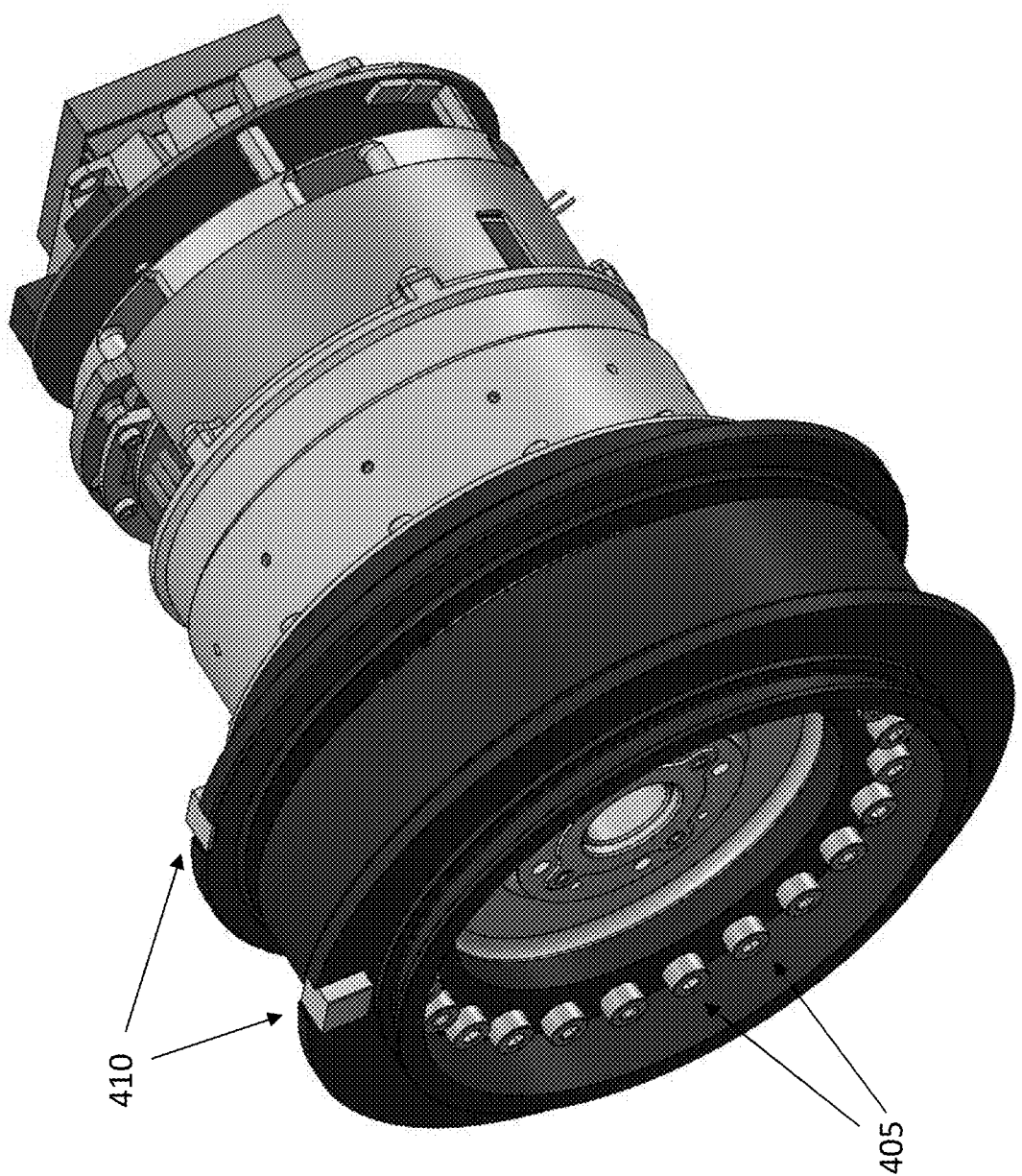
FIG. 4 illustrates a perspective external view of the actuator.

FIG. 4 illustrates an external perspective view of the actuator. Multiple fasteners (405) are visible at the output end. A tab and notch design can be used (410) to allow ease of assembly of the actuator. The tab and corresponding notch prevents the actuator parts from rotating relative to each other while assembling the actuator, or during maintenance or repair of an actuator during which it may be necessary to disassemble and reassemble the actuator.

Figure 5:
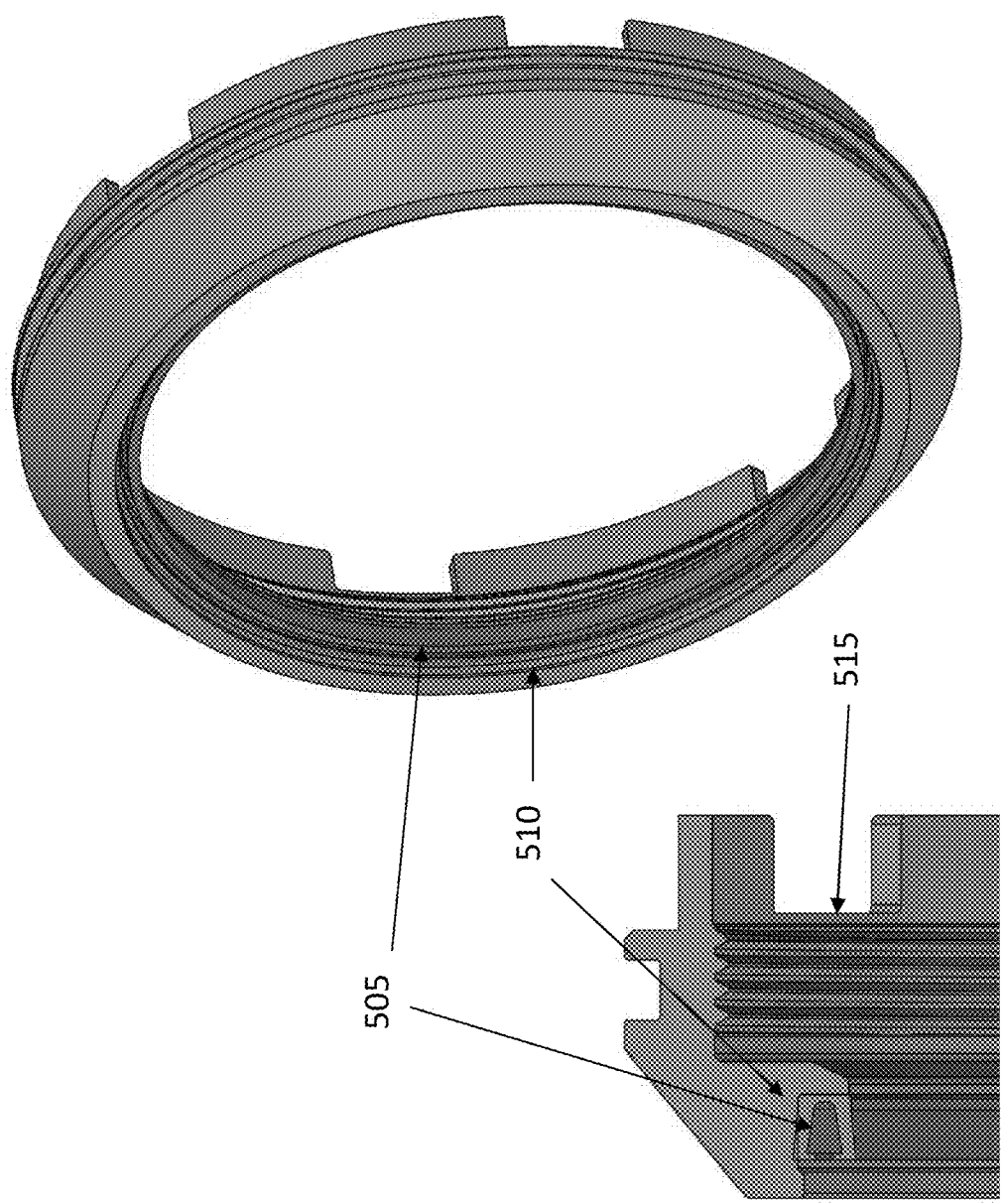
FIGS. 5-6 illustrate a radial seal.
Figure 6:
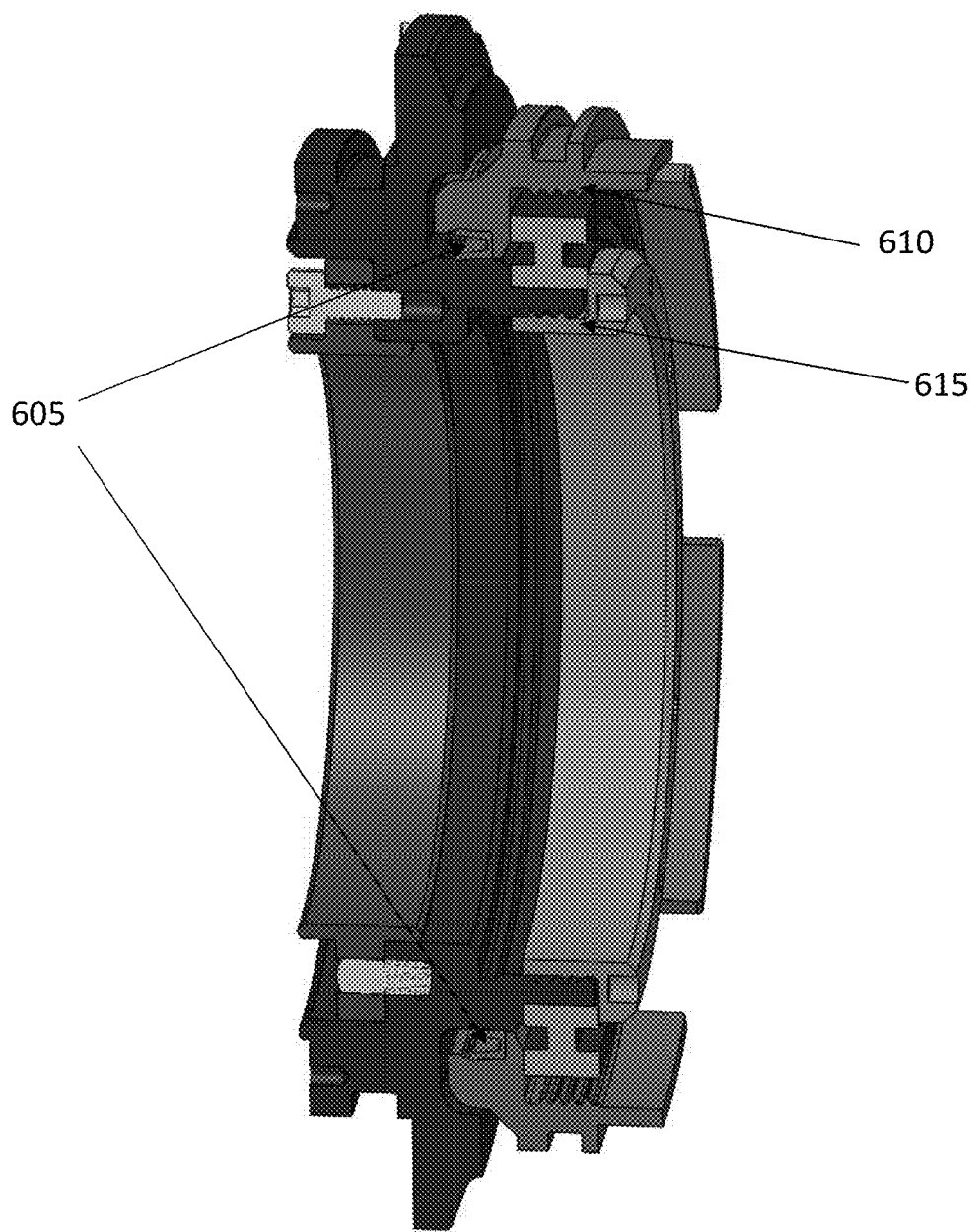
Figure 7:
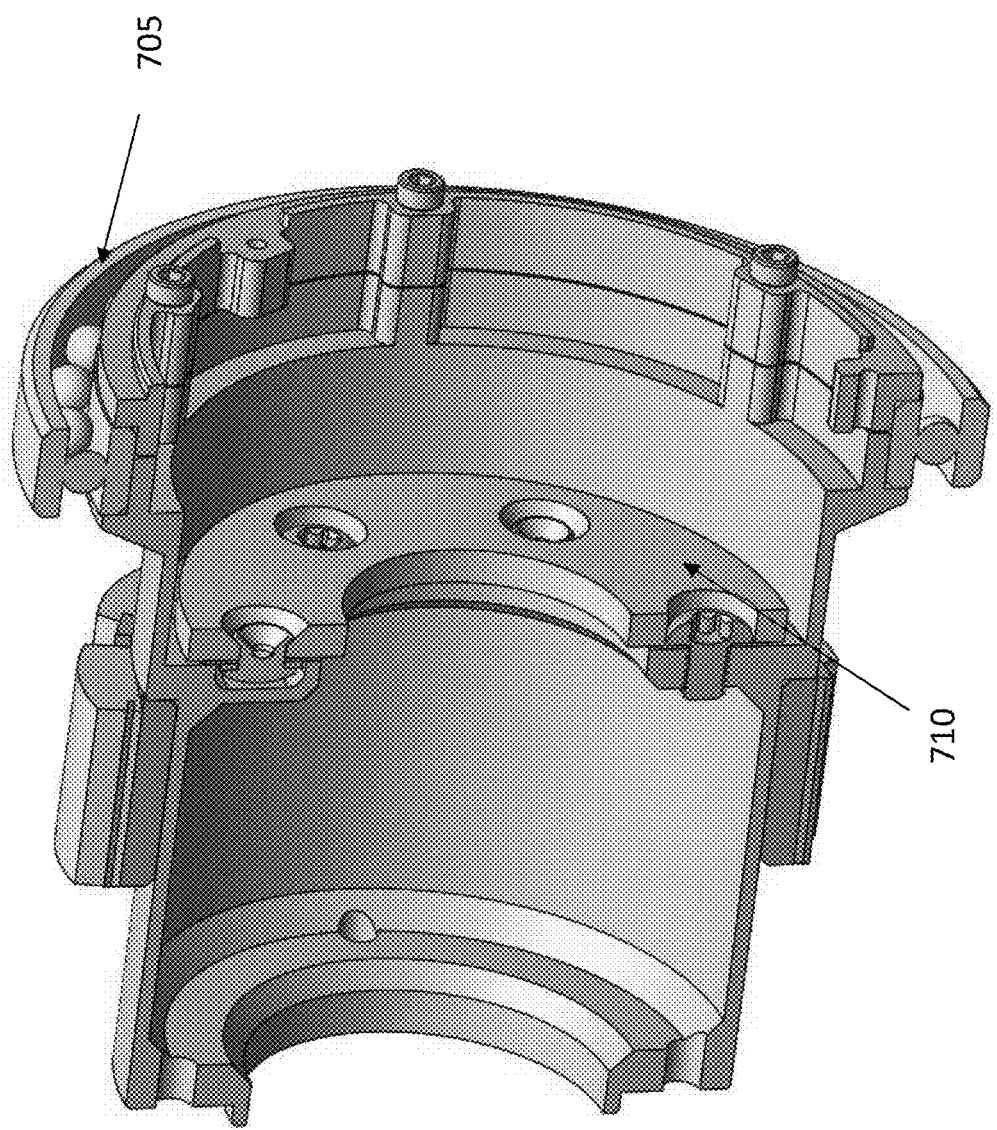
FIG. 7 illustrates motor rotor and support ball bearing.
Figure 8:
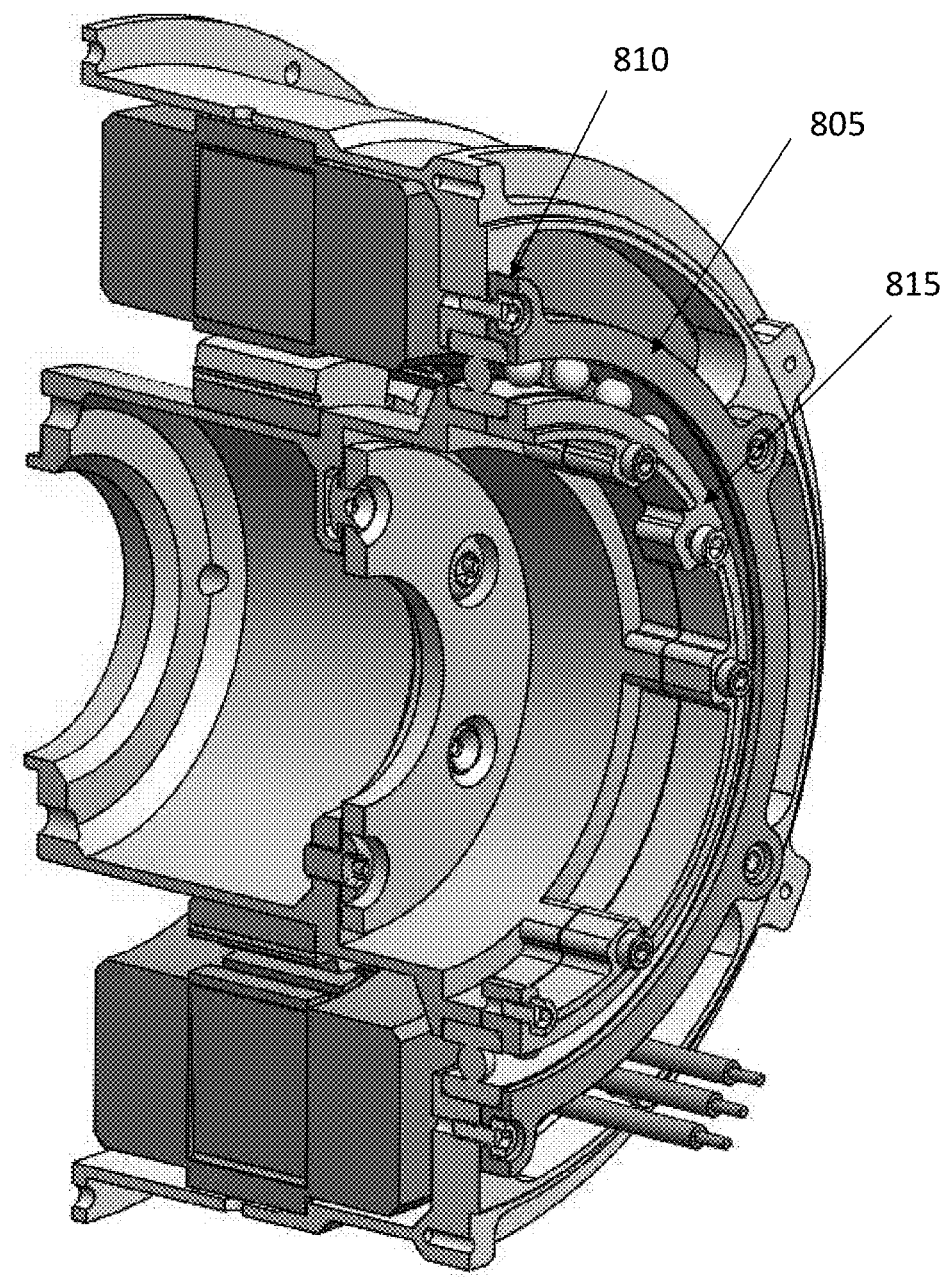
FIG. 8 illustrates inner components of the actuator.
Figure 9:
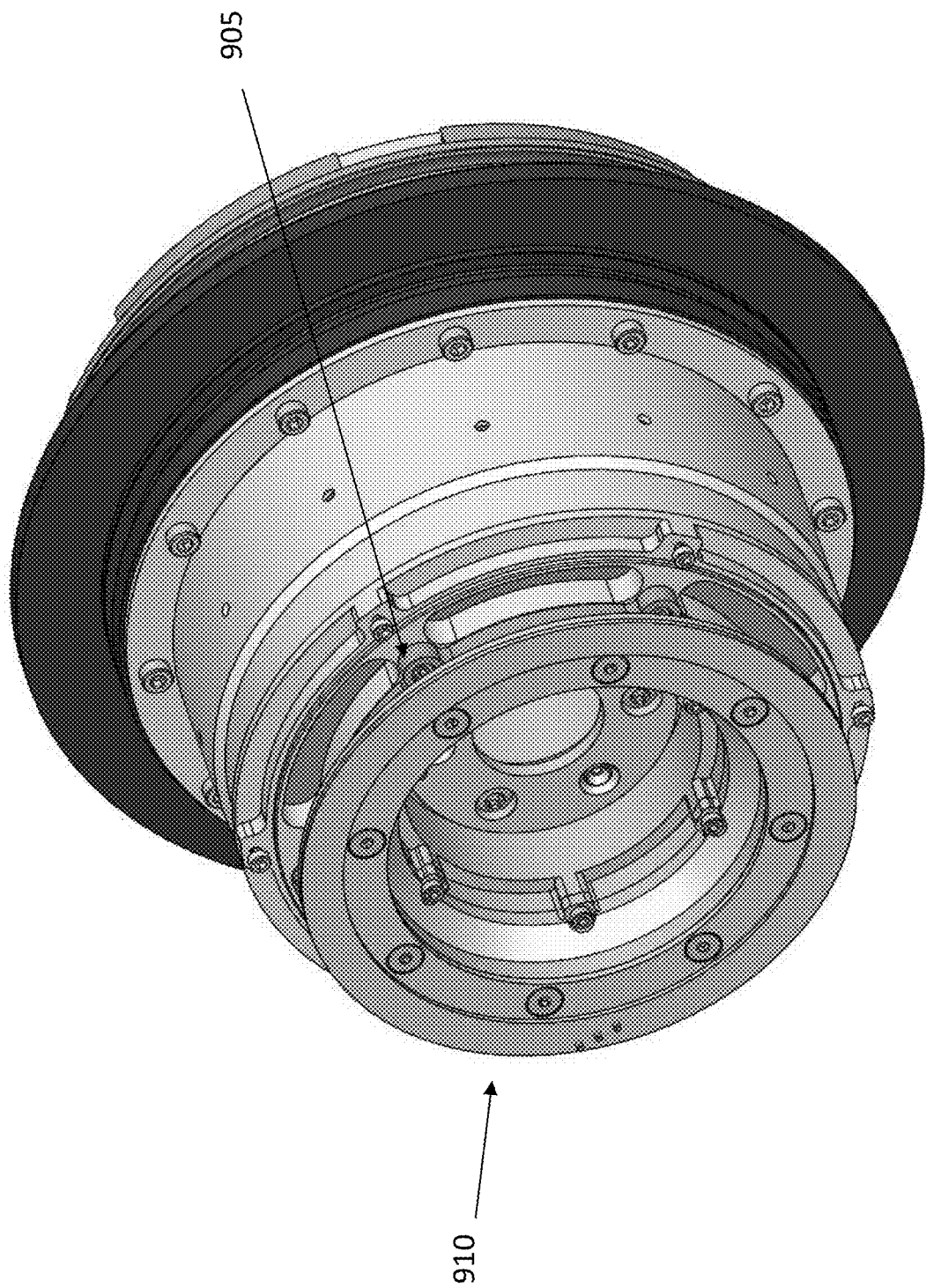
FIG. 9 illustrates an input end of the actuator.
Figure 10:
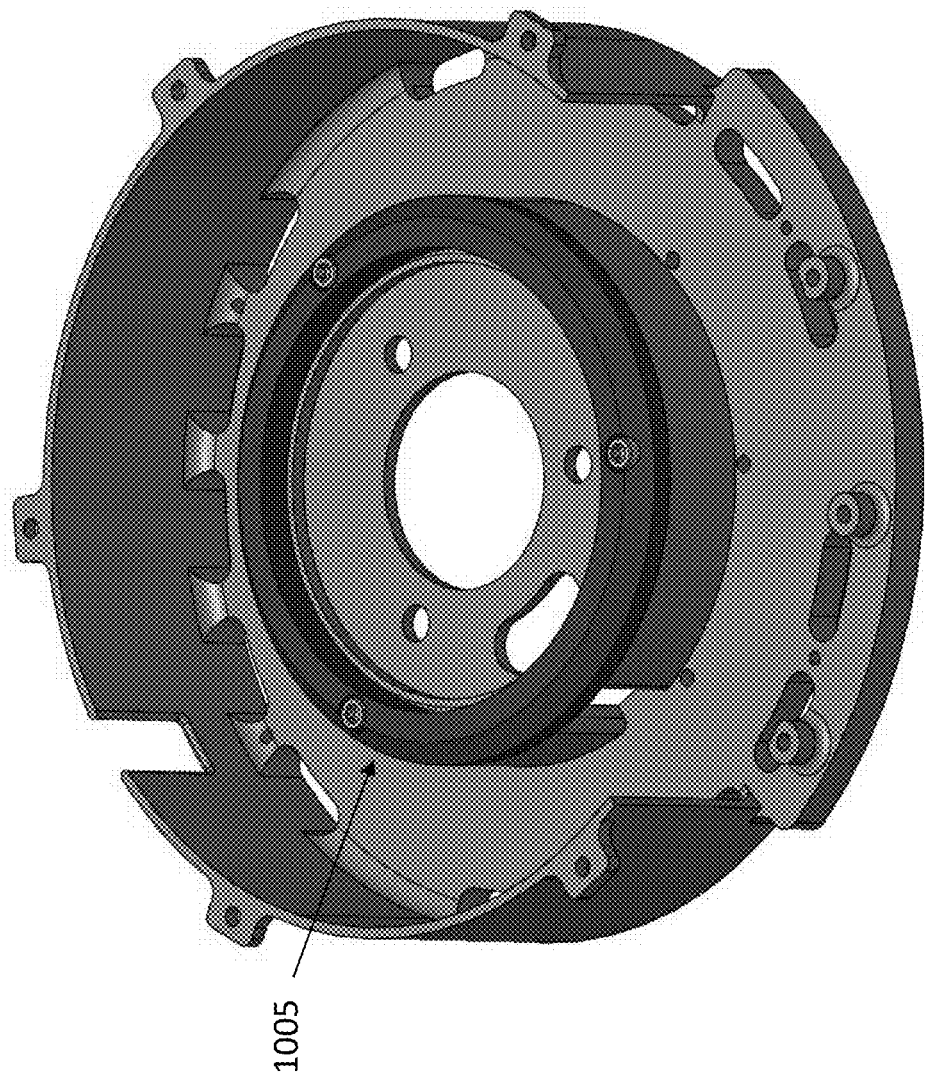
FIG. 10 illustrates a magnetic shield.
Figure 11:
FIG. 11 illustrates the inner cable tube.

FIG. 5 illustrates a radial seal (505) that has an inner groove designed to increase the sealing force when external pressure increases. The flexible radial seal installs into a groove of the outer output bearing clamp (510). The clamp has a thread (515) that allows it to screw onto a mating clamp to secure the output bearing. The radial seal is also visible in FIG. 6 (605). Threads (112,117) of FIG. 1 are visible in FIG. 6 as well (610,615). FIG. 7 illustrates a ball bearing (705) and brake disk (710). FIG. 8 illustrates the outer rotor bearing clamp (805), which is attached to the actuator by fasteners (810). The inner rotor bearing clamp (815) is also attached by fasteners. FIG. 9 illustrates a partial view of the output end of the actuator, with a partially visible outer rotor bearing clamp (905) and input encoder disk (910). FIG. 10 illustrates a view of the magnetic shield (1005), labeled as (140) in FIG. 1. FIG. 11 illustrates the inner, hollow tube that transmits the rotatory motion and acts as a conduit for harnessing. The disk (1105) allows reading of the rotation by the output encoder.

Figure 12:
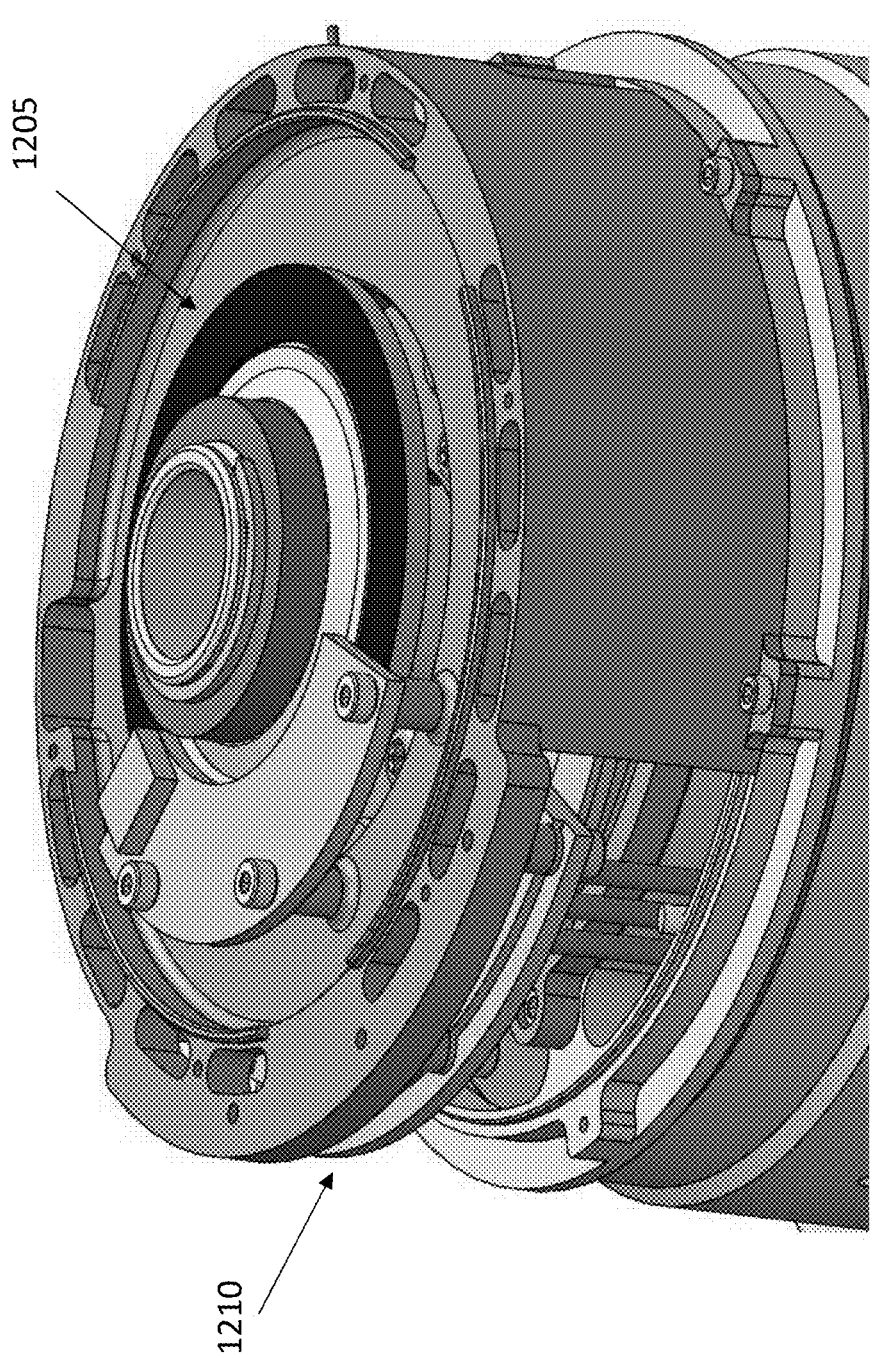
FIG. 12 illustrates a magnetic encoder.
Figure 13:
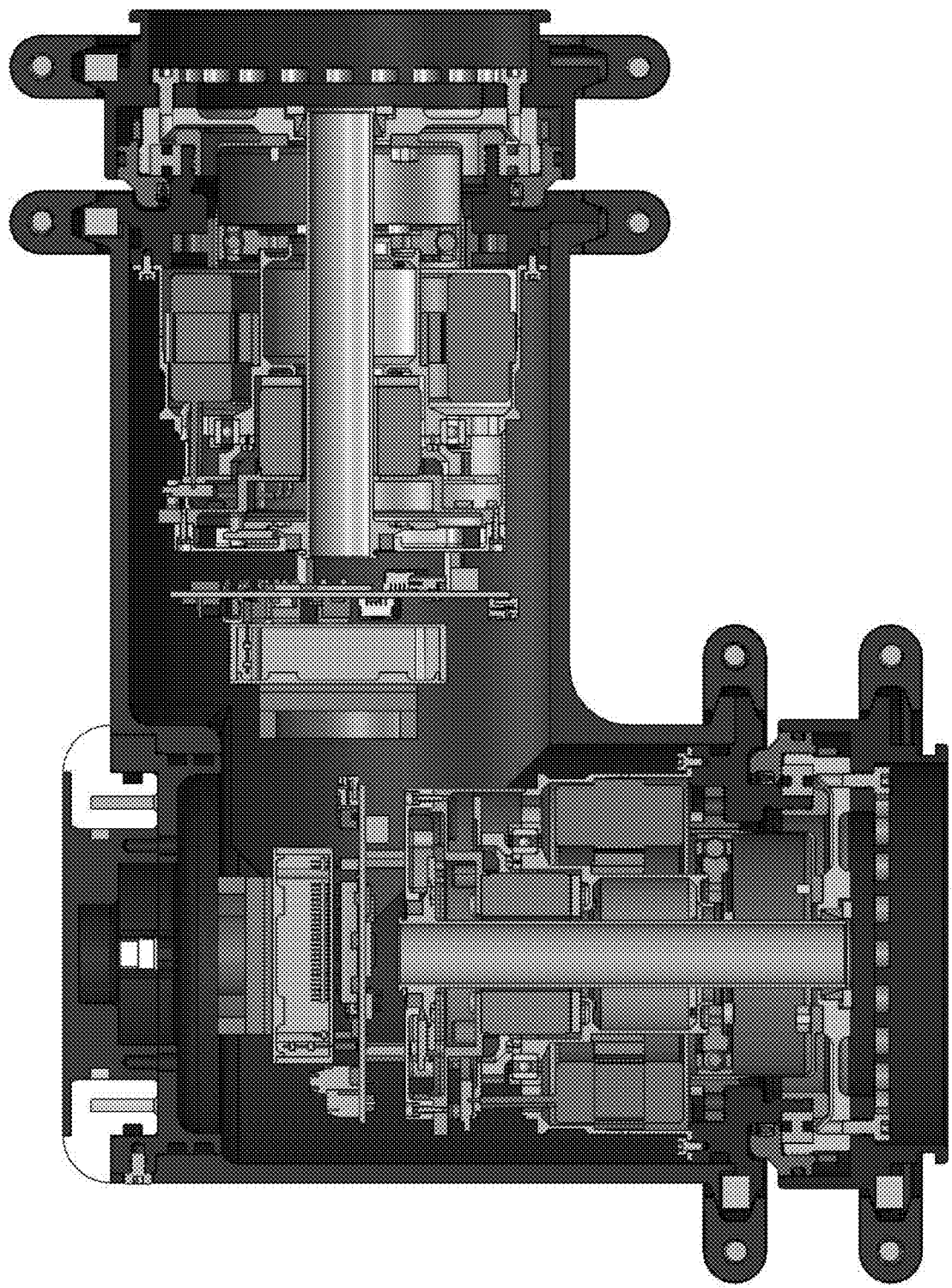
FIGS. 13-15 illustrate linked actuators mounted in sealed housings.
Figure 14:
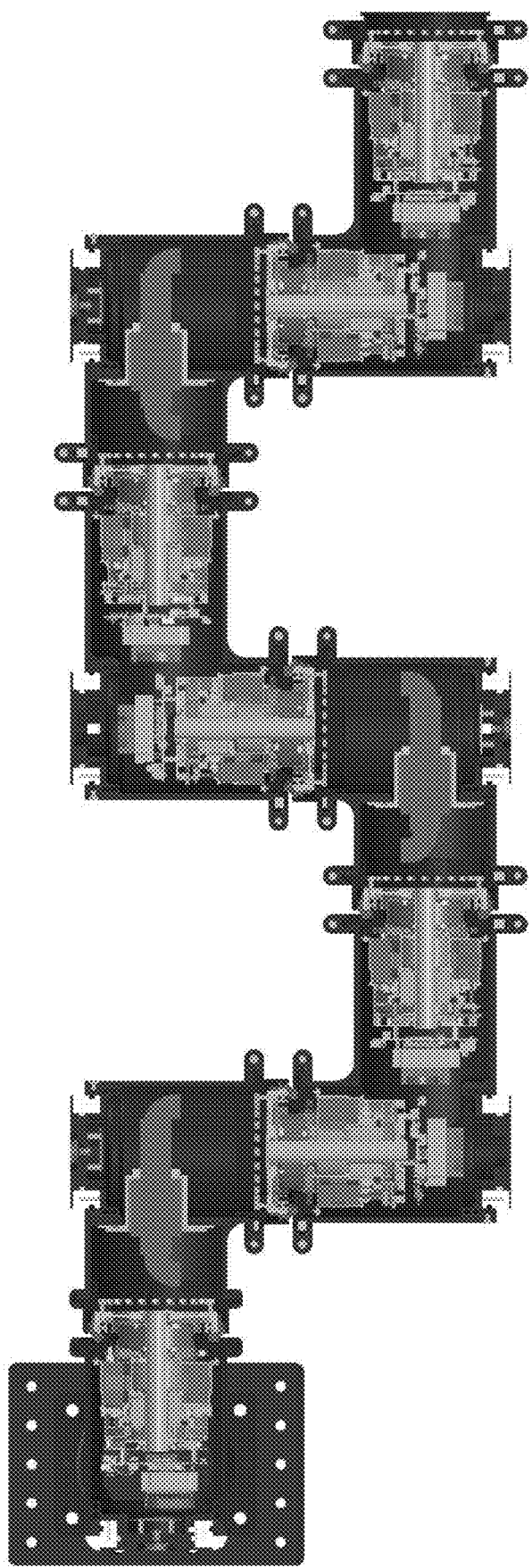
Figure 15:
Figure 16:
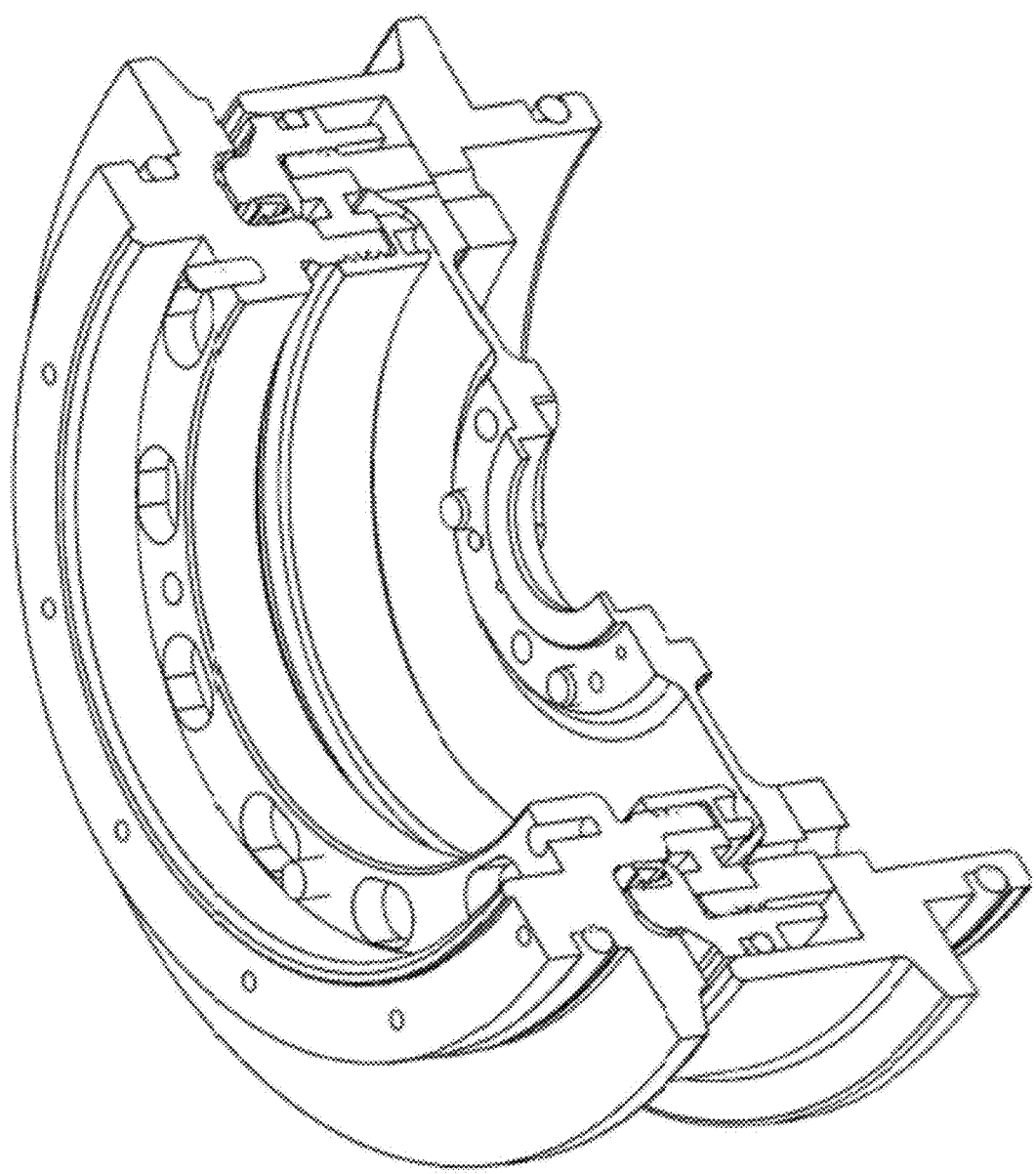
FIG. 16-17 illustrates inner components of the actuator.
Figure 17:
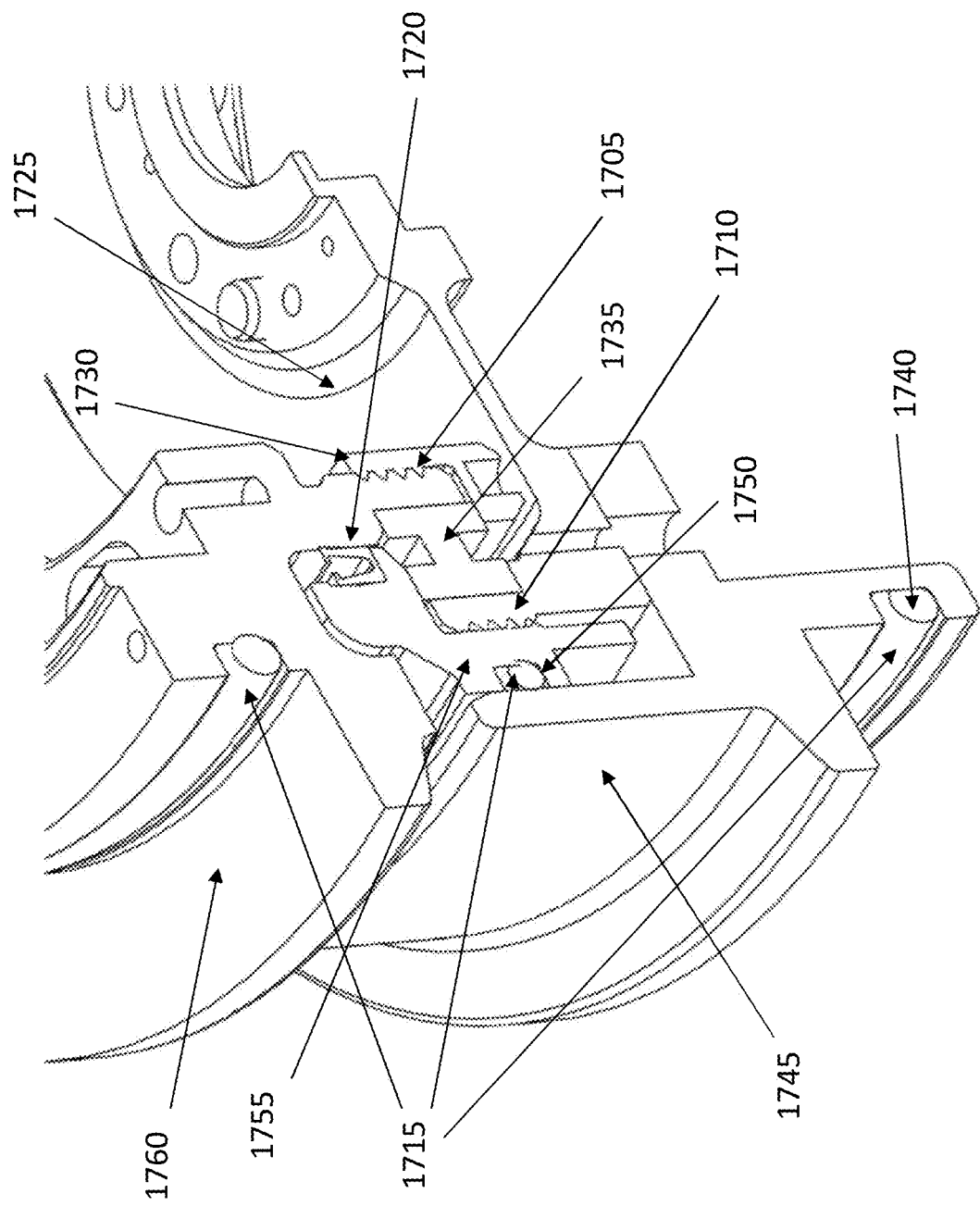
Figure 19:
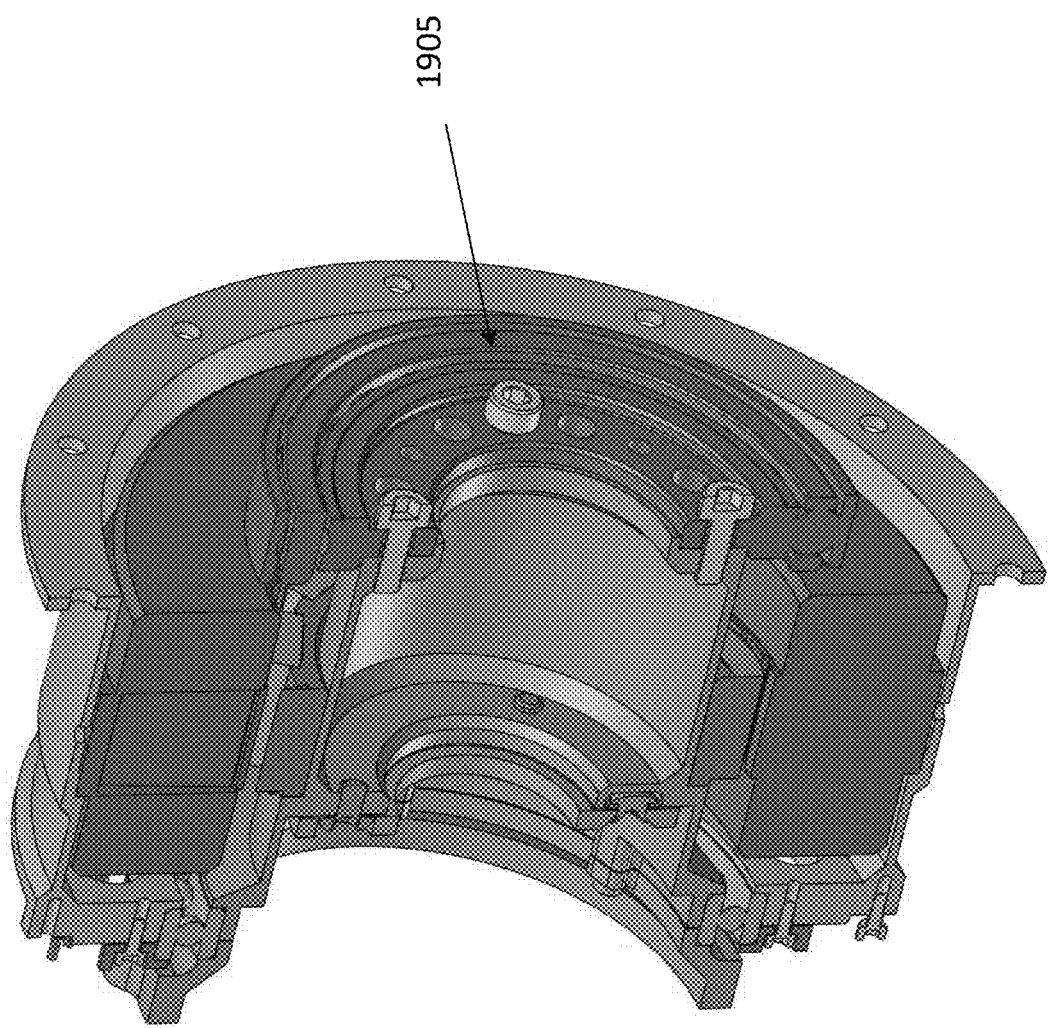
FIG. 19 illustrates a wave generator.
Figure 20:
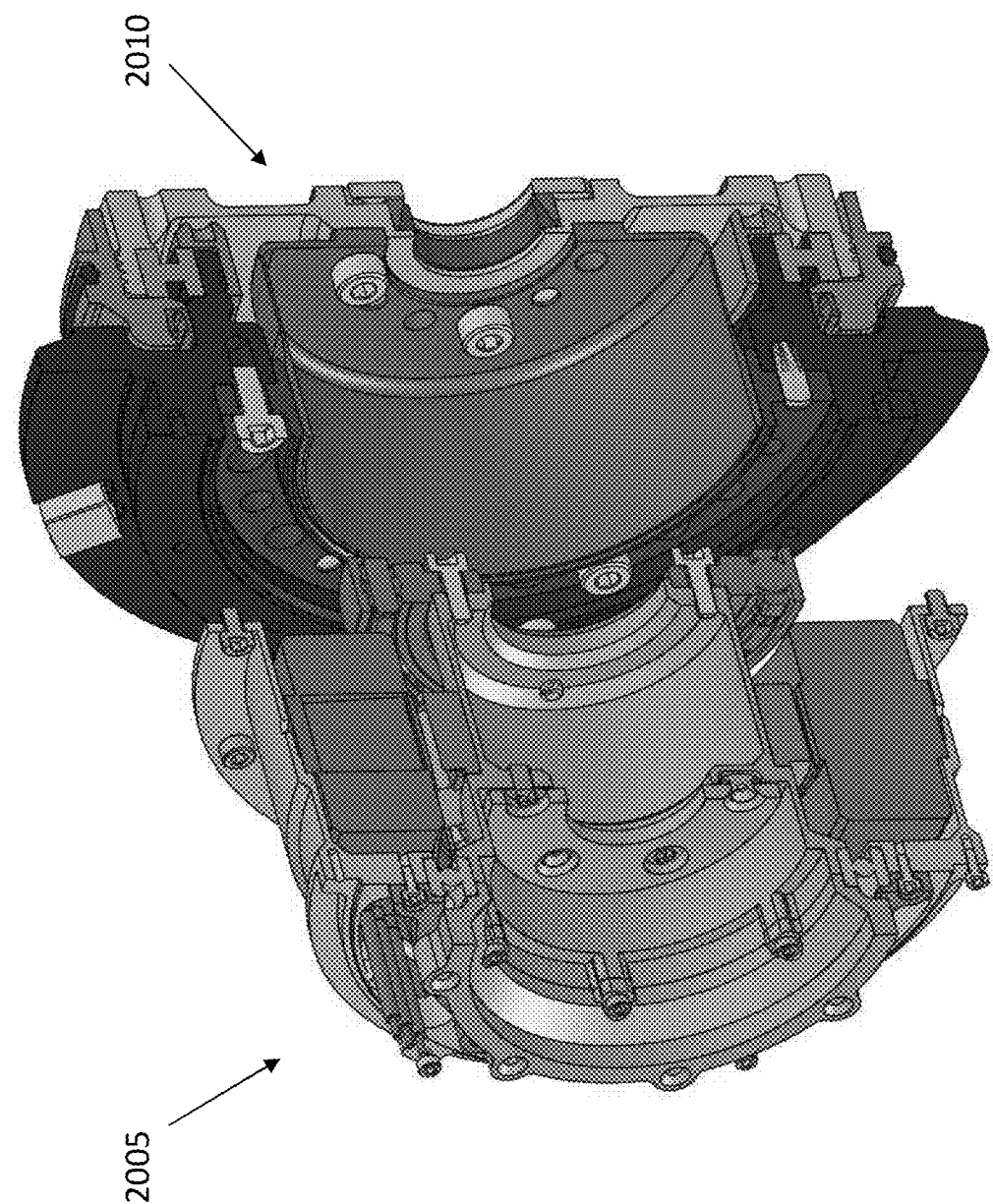
FIG. 20 illustrates the output assembly and the motor assembly.

FIG. 12 illustrates the input encoder disk (1210) and the output encoder disk (1205). FIG. 13 illustrates two actuators joined together. FIGS. 14-15 illustrate multiple actuators joined together. FIG. 16 illustrates a portion of the actuator. Threads (112,117) of FIG. 1 are visible in FIG. 17 as well (1705,1710). FIG. 17 also illustrates several O-rings (1715) and the radial seal (1720). In particular, FIG. 17 illustrates the output plate (1725); the radial seal (1720); the inner output bearing clamp (1730); the output bearing (1735); the endcap outer O-ring (1740); the endcap (1745); the endcap inner O-ring (1750); the outer output bearing clamp (1755); and the circular spline mount (1760). FIG. 19 illustrates the wave generator (1905). FIG. 20 illustrates the output assembly (2010) about to be attached (by fasteners) to the motor assembly (2005).

In some embodiments, the actuator can tolerate a cross-moment at least equal in magnitude to the actuator's output torque.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. An actuator comprising:
    an input end and an output end;
    an output plate at the output end;
    a brushless motor configured to generate a torque at the output plate;
    a harmonic gearset connected to the brushless motor;
    a hollow tube attached to the output plate and configured to rotate with the output plate, the hollow tube having an output encoder disk at the input end, the output encoder disk configured to rotate with the hollow tube;
    an absolute magnetic output encoder at the input end, configured to read a position of the output encoder disk, thereby obtaining a position of the output plate;
    an input encoder disk at the input end and attached to a rotor of the brushless motor;
    an absolute magnetic input encoder at the input end, configured to read a position of the input encoder disk;
    a magnetic brake configured to brake the brushless motor;
    a circular magnetic shield between the magnetic brake and the absolute magnetic output encoder, configured to shield the absolute magnetic output encoder from magnetic interference by the magnetic brake;
    a plurality of ball bearings configured to allow the brushless motor to rotate relative to the actuator;
    a plurality of circular seals configured to seal an inside of the actuator from a liquid environment outside the actuator; and
    a plurality of clamps configured to compress the plurality of circular seals.

2. The actuator of claim 1, wherein the plurality of clamps comprises at least one threaded portion.

3. The actuator of claim 1, wherein an outer frame of the actuator comprises two circular flanges, and further comprising a Marman clamping together the two circular flanges.

4. The actuator of claim 1, wherein the plurality of circular seals comprises a plurality of O-rings, and a radial seal, wherein the radial seal comprises a groove configured to increase a sealing pressure upon increase of a pressure external to the actuator.

5. The actuator of claim 1, wherein the actuator is configured to generate a ratio of actuator torque to total actuator volume of at least 100 Nm/l.

6. The actuator of claim 5, wherein the actuator has a pressure rating of 10.9 atm.

7. The actuator of claim 1, wherein the plurality of clamps is attached to the actuators by a plurality of fasteners.

8. The actuator of claim 1, wherein the harmonic gearset has zero backlash.

* * * * *